United States Patent [19]

Pompei et al.

[11] Patent Number: 4,566,808
[45] Date of Patent: Jan. 28, 1986

[54] SCANNING RADIATION DETECTOR

[75] Inventors: Francesco Pompei, Wayland; Shiraz Daya, Franklin, both of Mass.

[73] Assignee: Exergen Corporation, Natick, Mass.

[21] Appl. No.: 466,789

[22] Filed: Feb. 16, 1983

[51] Int. Cl.[4] ............................ G01K 1/02; G01J 5/10
[52] U.S. Cl. ..................................... 374/124; 33/262; 250/342; 340/753; 374/121
[58] Field of Search ............... 374/121, 124, 159, 129, 374/170; 250/338, 342, 372; 340/753, 784; D10/57; 354/198, 199; 33/262

[56] References Cited

U.S. PATENT DOCUMENTS

| | | | |
|---|---|---|---|
| 1,893,421 | 1/1933 | Latzko et al. | 340/753 X |
| 3,289,025 | 11/1966 | Bullinger | 340/753 X |
| 3,430,243 | 2/1969 | Evans | 250/342 X |
| 3,444,739 | 5/1969 | Trehame | 374/128 |
| 3,710,115 | 1/1973 | Jubb | 250/372 |
| 3,933,044 | 1/1976 | Loper et al. | 250/342 X |
| 3,947,722 | 3/1976 | Strom et al. | 340/753 X |
| 3,977,086 | 8/1976 | Williams | 33/277 |
| 4,045,670 | 8/1977 | Anderson et al. | 250/338 |
| 4,072,055 | 2/1978 | Elliott | 374/160 |
| 4,081,678 | 3/1978 | Macall | 250/330 |
| 4,176,556 | 12/1979 | Takenaka | 374/170 |
| 4,246,785 | 1/1981 | Sellers et al. | 374/159 X |
| 4,301,512 | 11/1981 | Keith et al. | 340/753 X |
| 4,301,682 | 11/1981 | Everest | 374/121 X |
| 4,343,182 | 8/1982 | Pompei | 374/31 |
| 4,420,265 | 12/1983 | Everest et al. | 374/124 |
| 4,429,979 | 2/1984 | Tarada | 340/753 X |
| 4,447,884 | 5/1984 | Wada | 374/170 |

OTHER PUBLICATIONS

Raytek Inc. advertisement for Raynger 11 in Circle 11 Measurement and Control News, (p. 11), Dec. 1982.
"Protechniques", Edward Meyers, Popular Photography, Sep. 1977, pp. 140-150.
Linear Laboratories, Thermoflow TM "Energy Meter" advertisement, Jan. 1980.

Primary Examiner—Daniel M. Yasich
Attorney, Agent, or Firm—Hamilton, Brook, Smith & Reynolds

[57] ABSTRACT

A radiation detector includes a flat housing 14 having a radiation sensor 16 at one end thereof and a bar graph display 18 at the other end thereof. The bar graph display provides an indication of radiation sensed from a limited surface area as the sensor is scanned across an extended surface area. The width of the housing 14 is such that, when the housing is held at about arm's length in the line of sight, the width defines a field of view which approximates the field of view of the radiation sensor.

20 Claims, 7 Drawing Figures

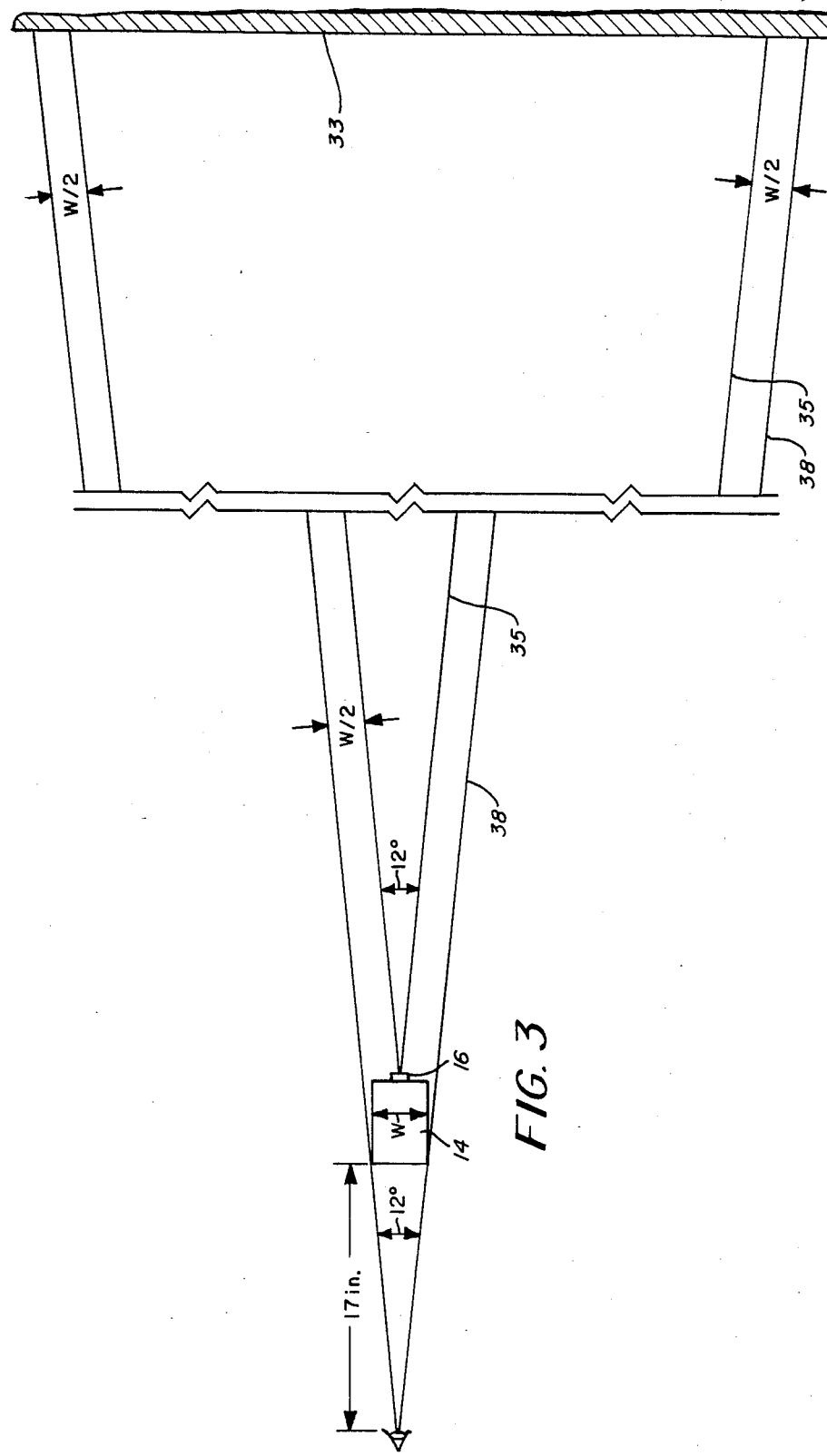

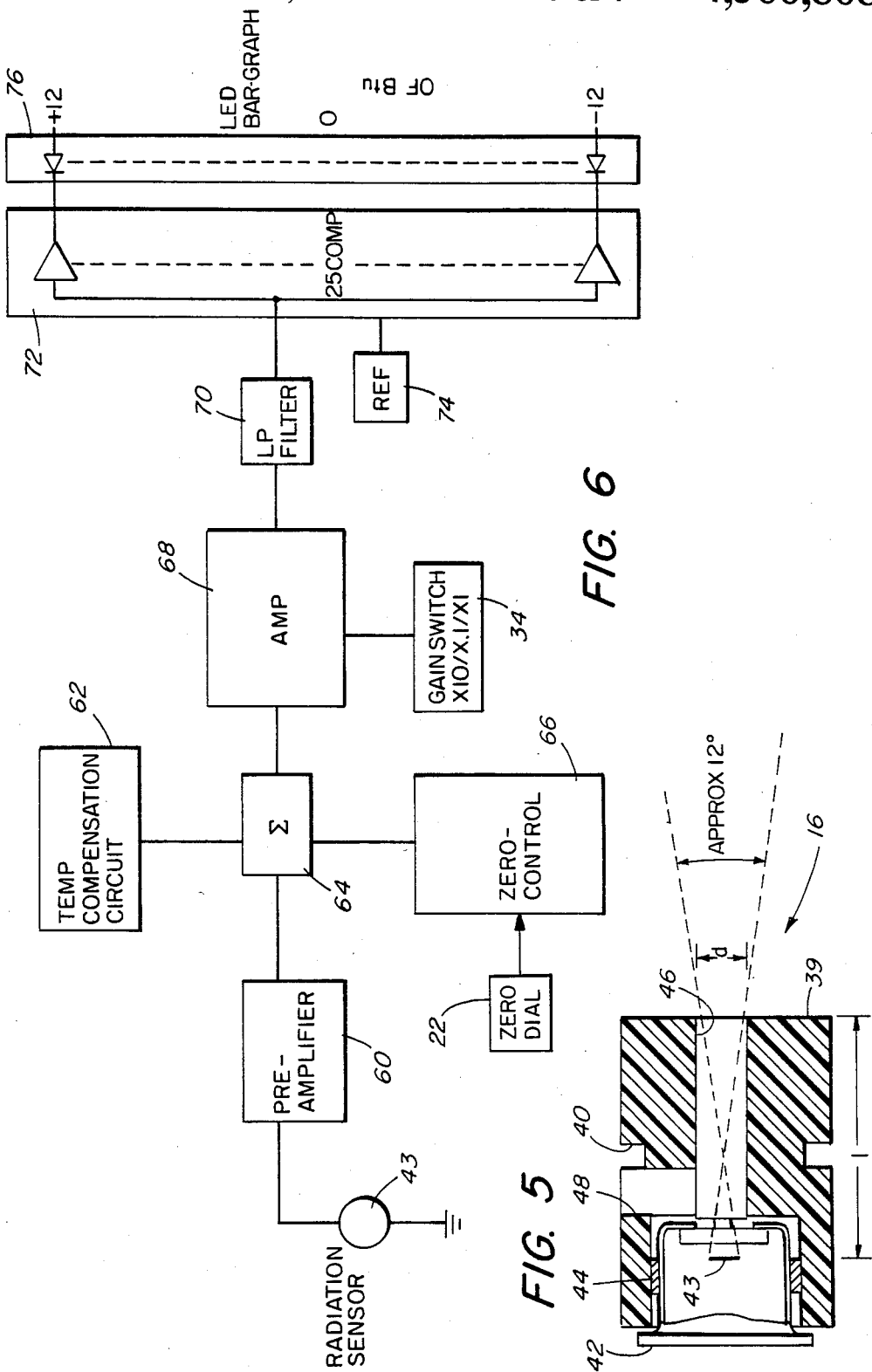

SCANNING RADIATION DETECTOR

DESCRIPTION

FIELD OF THE INVENTION

This invention relates to radiation detectors and in particular to such detectors used for measuring heat loss and temperature differences from buildings, plumbing, machinery and the like and temperature differences on other objects such as animals and humans.

BACKGROUND

With the increasing costs of fuel, efforts at energy conservation are becoming increasingly cost effective. A major tool in determining the investments to make toward energy conservation is the measurement of the heat loss from buildings, machinery and the like. Typically, determining the amount of heat loss is time consuming and usually inaccurate. Improving the accuracy usually involves much testing of surface temperatures and other parameters, the recording of large amounts of data, and calculations based on engineering estimates. Infrared scanning devices have also been used to scan a surface and detect the radiation heat losses from that surface. Often the output of the scanning detector is used to produce a photographic image of hot and cold spots on a surface. The scanning hardware and electronics are complex.

Less complex heat loss meters may include a simple infrared detector and digital display. Such devices provide a more convenient tool for quick measurements of localized areas. They do, however, suffer difficulties in aiming the infrared detectors at desired locations. Further, for sensitivity of about 0.1 Btu/hour-square foot, magnifying optics which complicate the system may be required.

U.S. Pat. No. 4,343,182, relates to a heat loss detector for sensing and recording the heat loss from an extended surface area such as the side of a building or a machine. That device is not intended, however, to serve as an inexpensive detector for use in detecting small localized heat sources.

An object of the present invention is to provide a device which can be easily and quickly used by a relatively inexperienced technician to scan a surface and determine the heat losses from the surface. A further object of the invention is to provide such a device which is relatively inexpensive and portable. Because of the simplicity, convenience and low cost, the present invention has also found application in medical diagnostics for both human and animal patients.

DISCLOSURE OF THE INVENTION

In accordance with one aspect of the present invention, a hand held radiation detector includes a radiation sensor positioned at one end of a housing. The radiation sensed by the radiation sensor includes the infrared range of wave lengths. A bar graph display is also provided on the housing. The bar graph display has a quick response such that an area of interest can be scanned with the radiation sensor while the user of the instrument observes the bar graph. High and low levels of radiation (wave energy) within a scan are readily observed on the bar graph and differential readings between the high and low regions are quickly obtained.

In accordance with another aspect of the invention, the radiation sensor housing has a transverse dimension which defines an approximate field of view of the sensor when the housing is held in the line of sight a predetermined distance from the eye. For example, a housing having a transverse dimension of about 3½ inches held at arm's length from the eye defines a field of view of about 12 degrees. With a sensor field of view of 12 degrees, the user of the instrument has a convenient indication of the approximate localized surface area which is being observed by the sensor.

By attempting to provide only differential readings, rather than absolute readings, the need for an extended bar graph is avoided; but the information required in many situations where heat transfer is to be determined is readily available.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 3 is a schematic illustration of the field of view defined by the radiation sensor housing positioned approximately 17 inches from the eye of the user.

FIG. 5 is a cross sectional view of the radiation sensor mounting assembly of the embodiment of FIG. 1;

FIG. 6 is a block diagram of the electrical circuit used in the detector of FIG. 1.

DESCRIPTION OF PREFERRED EMBODIMENTS

Figure 1:
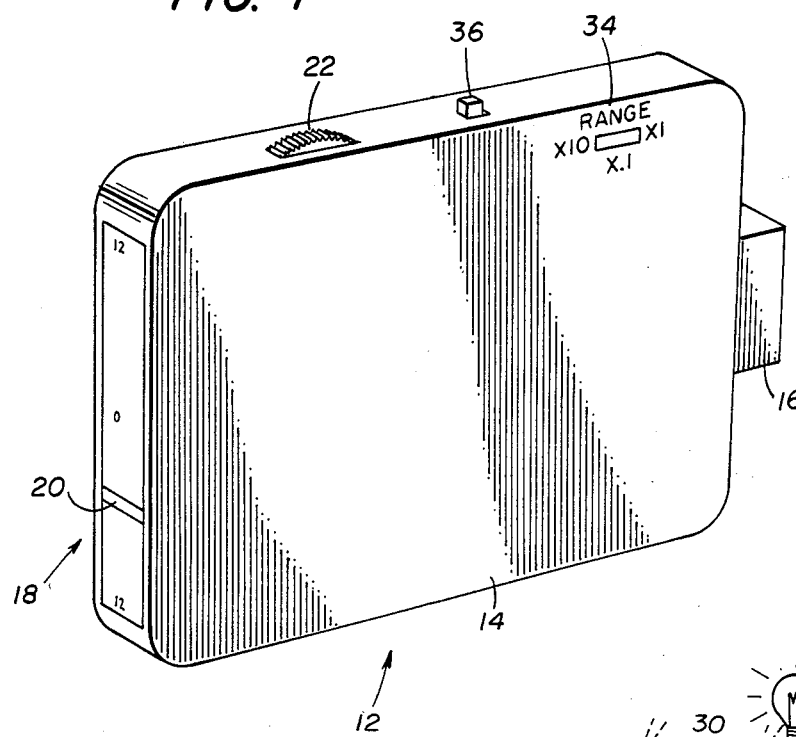
FIG. 1 is a perspective view of a heat detector embodying this invention and having a bar graph display at an end of a housing opposite to a radiation sensor.

A radiation detector 12 comprises a box-like housing 14. This housing has approximate dimensions of 3⅜ inches by 5 inches by ⅝ inch. The flat, hand held housing can be easily carried in a pocket. A radiation sensor assembly 16 is positioned at one end of the housing 14.

An LED bar graph display 18 is located at the end of the housing 14 opposite to the sensor assembly 16. This particular bar graph includes a scale centered at zero extending to plus and minus 12 BTU/hr-sq.ft. The same scale provides an approximation in degrees Fahrenheit. The location of an illuminated indicating region 20 on the scale provides an indication of radiation detected by the sensor assembly 16 relative to some reference established by a zeroing dial 22. For example, the radiation sensor assembly 16 can be pointed toward a reference wall while the indication 20 conventionally is moved to the zero point or any other point on the scale by rotation of the dial 22 to change the signal applied to the summing circuit 64 by the zero control 66 of FIG. 6. Any further readings on the scale are then referenced to that signal and thus to the reference wall. Using this approach, a very simple bar graph of limited length can be used while the necessary information, that is differential information, is directly read from the bar graph.

Specific uses of the differential readings will be discussed below.

The term "bar graph" is used loosely in that a full bar to the indication 20 is not displayed, although such a bar graph might also be used. In this case, only the uppermost portion of the "bar" is actually displayed. It is important, however, that the display be a linear display in which the position of a display element on a linear scale provides an analog indication of detected radiation. It is also important that the sensor and bar graph have a quick response of a time constant of about 0.1 sec in order that the user of the instrument can scan across an extended surface to provide a quick indication of maximum or minimum heat or temperature difference from a specific localized region of that surface.

Figure 2:
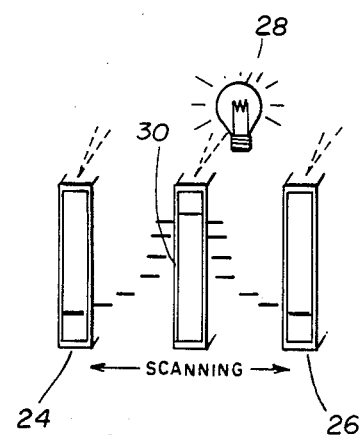
FIG. 2 is a schematic illustration of use of the detector of FIG. 1 to scan a radiation source.

FIG. 2 illustrates an example of the use of the device to scan a region to pinpoint a source of maximum radiation. While directed to a neutral surface as in the position 24, the indication 20 is set at a low region of the scale, as at about −6. The radiation sensor is then scanned across a wide field to a position 26. Within that field, the sensor senses radiation from a light source 28. As indicated by the scale positions shown schematically between the two end positions 24 and 26, the indication 20 rises to a maximum level at the position 30 at which the sensor is directed at the light source 28. The difference between the neutral reading and the peak reading is the difference measurement of interest. The maximum is much more readily picked up by an observer using a bar graph display than it would be with a digital numeric display.

In situations where the full 24 unit scale is not required, it is convenient to automatically zero the indication 20 when the device is pointed at a neutral surface. For that purpose, an electronic circuit is provided to automatically zero the display. By pressing the power button 36 the indication 20 is automatically set at the zero position on the scale for the surface at which the sensor 16 is directed. Thereafter, a difference indication, which is often the indication of interest, can be read directly from the bar graph without further calculations. A switch may be provided in place of the dial 22, having three positions such that the user may select the display location for the automatic zero circuit. The user may then use the entire 24 position display range by selecting a zero location at the top or bottom as well as center.

To vary the sensitivity of the detector to allow for use of the full range of the scale where various levels of radiation are detected, a range switch 34 is provided. In this case, three range positions are provided; the units on the scale are to be multiplied by 0.1, 1 or 10.

To minimize drain on the battery which serves as the power supply for the unit, the unit is only operational when the button 36 is pressed.

Figure 4:
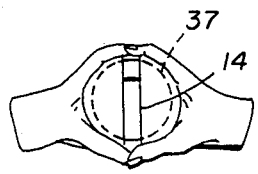
FIG. 4 is an illustration of the field of view of FIG. 3 as seen by the user of the detector.

The width of the housing 14 is uniquely matched to the field of view of the sensor 16. When the device is held in the line of sight to the surface of interest at about arm's length, the $3\frac{3}{8}$ inch width of the housing, projected onto the surface of interest approximates the diameter of the local region observed by the radiation sensor. As shown in FIG. 3, the radiation detector positioned about 17 inches from the eye defines a field of view of 2 arctan (w/2)/17 where w is the width of the detector housing. A $3\frac{3}{8}$ inch housing establishes a 12 degree field of view within a cone 38. The sensor 16 also has a 12 degree field of view within a cone 35. The center portions of the cones, along their lengths, have been deleted to fit the drawing on a single sheet. Thus, as shown in FIG. 4, the surface 33 observed by the radiation sensor, indicated by the broken line 37 in FIG. 4, is slightly smaller than the circle defined by the radiation detector housing indicated by the area within the hands. The difference between the two fields of view is the width of the housing 14. That width is insignificant for a surface observed at several feet or more. If the field of view of the sensor were somewhat greater than the field of view established by the width of the housing 14 at arm's length, the two fields of view might converge at some point. In either case, the projected width of the housing provides a good approximation of the surface being observed.

Although housings having other shapes and sizes with specific transverse sighting dimensions matched to the field of view of the sensor might be used, the use of the wide dimension of a flat housing has particular advantages. As shown in FIG. 4, the use of the large dimension of the flat housing allows a substantial portion of the localized region being observed by the sensor to also be observed by the user to either side of the housing. There is no need to guess as to what is actually being observed.

A cross section of the sensor assembly 16 is shown in FIG. 5. It is formed of a black, synthetic plastic body 39, preferably of low thermal conductivity and of the material sold under the trademark Delrin. The body 39 has a notch 40 formed therein. The sheet metal of the housing 14 is seated within that notch 40 in the final assembly to hold the sensor assembly 16 securely in position. The thermopile sensor housing 42 is seated in a large bore in one end of the plastic body 39 and is spaced from that body by a sleeve 44 for purposes of thermal isolation. A smaller bore 46 formed through the body 39 serves as a sight hole.

The length and diameter of that bore, 0.5 inch and 0.125 inch respectively, establishing the 12 degree field of view of the thermopile sensor housing 42. The end of the bore forms a 0.125 inch optical aperture and the walls of the bore, which are black, absorb substantially all radiation which does not pass directly through the aperture. The field of view established by the bore is, to a good approximation, 2 arctan ((d/2) 1) where d is the diameter and 1 is the distance from the active element 43 inside the sensor to the exposed, aperture end of the bore. In this case that distance is 0.625 inch. With reference back to the calculation of field of view established by the detector housing in the line of site, to have the field of views match, d/1 should equal w/17.

A vent hole 48 is provided from one side of the body 39 into the bore 46 so that dust and the like can be cleared from the bore 46 and the thermopile by blowing air through either bore 46 or hole 48.

The thermal isolation provided by the block 39 minimizes reading drift associated with minute temperature changes of the body of the thermopile sensor. The surfaces of the field of view limiting sight hole 46 quickly equilibrate with the environment without the necessity of waiting for the entire block to change temperature.

The thermopile is of very low mass for purposes of fast response. In the preferred embodiment, its optical window is of the broad band type with essentially flat response from approximately 0.5 microns to 50 microns. Thus, this sensor senses radiation into the visible range as well as infrared radiation. As such, the radiation detector provides total radiation loss or gain signals rather than just infrared signals. This extended range can be significant when one is considering the effects of solar radiation.

Figure 7:
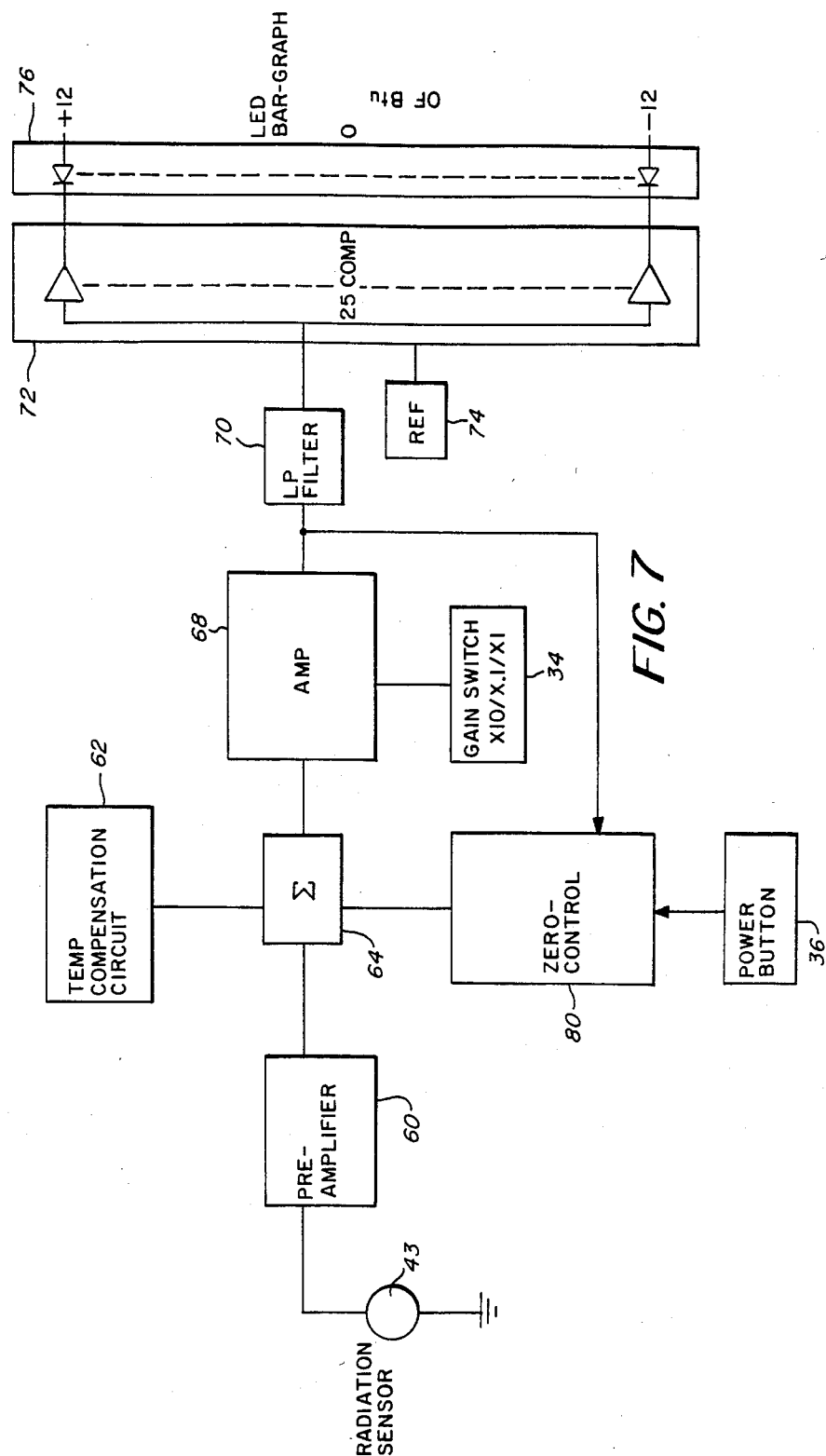
FIG. 7 is a block diagram of an alternative electrical circuit for providing an auto zero function.

A block diagram of the electrical circuit used in the detector is provided in FIG. 6. The signal from the thermopile sensor element 43 is amplified in a preamplifier 60. The thermopile signal is a function of both the temperature of the subject and the temperature of the thermopile. To compensate for the latter temperature, the temperature of the thermopile is sensed and processed in a temperature compensation circuit 62. When added to the thermopile signal in the summing circuit 64, a signal which is dependent only on the subject is obtained. The thermopile signal is also summed with a zero control signal from the zero control circuit 66. That circuit may respond to the manual zero control dial 22 as discussed above to adjust the indication of the bar graph display. An alternative circuit for auto zero control is shown in FIG. 7. In this circuit the zero control circuit 80 responds to pressing of the power button 36.

The compensated and zeroed signal is amplified in an amplifier 68. The gain of that amplifier is determined by the range switch 34. The amplified signal is applied through a low pass filter 70 to a bank of comparator circuits 72. Depending on the level of the signal from the filter 70 relative to a reference 74, one of the comparators in the bank 72 draws current through a light emitting diode in the array 76. The diodes in the array 76 are arranged to form the bar graph display 18.

The usefulness of the radiation detector described above can best be recognized through a few examples of use of the device. As one example, one may check a steam trap between two lengths of pipe by scanning along the pipe past the trap. Properly functioning traps show a significant temperature difference of 10 degrees or more between the steam side piping and condensate side piping. This temperature difference should be seen when one scans across trap from the upstream pipe to the downstream pipe. If there is no difference in temperature, the the trap is almost certainly leaking. If the steam to the device served by the trap is off, then the downstream temperature may be higher than the upstream temperature.

For traps which are at a distance, for example 10 feet high along a ceiling, the best method for testing is to scan across the piping, both upstream and downstream of the trap. If necessary, the times 0.1 scale may be used to improve sensitivity. A leaky trap shows the same reading upstream and downstream.

Voids, wet spots and air leaks in insulation can be located by scanning building walls, furnace walls, piping, vessels and so on. One need only scan the surface of interest with the radiation detector and watch the bar graph display. Hot and cold spots are identified by the ups and downs of the display.

Out of reach air supply registers can be quickly checked by scanning the registers with the radiation detector. For cooling sources, the air supply should be 10° F. below room temperature, then the scan should show the dot drop about 10° F. as the register is scanned. The same holds for warm air sources. The warm or cold air heats or cools the register and this is detected by the radiation detector.

Operating in the x.1 range, the radiation detector can detect even very small amounts of heat generated by electric power flowing through a good junction such as a fuse, circuit breaker or the like. It can be determined whether a circuit is carrying power even without an ammeter. A good electrical junction should be no more than a few degrees above ambient. A poor junction is considerably hotter and may be detected even with the junction box cover closed.

Similarly, the friction heat generated by bad bearings in motors and other equipment can be quickly checked by scanning with the radiation detector. If the bearing scans at more than 40° or 50° F. above ambient, it should be investigated.

Steam lines under floors and in walls and ceilings generate considerable heat and can easily be found by scanning a surface and looking for the telltale movement of the bar graph display. The piping can be traced by following the heat as indicated by the display. Leaks in the piping show up as hot spots.

Scans of humans or animals may be performed in medical diagnostics to indicate areas of inflammation or lack of circulation.

Selection of the particular field of view used is of some importance with respect to the specific applications. Because this instrument is designed for use in scanning extended surface areas rather than taking a total heat flux measurement from the extended surface area, the field of view should be less than the 20 degree or greater field of view used in the device of prior U.S. Pat. No. 4,343,182. On the other hand, a too small field of view of less than about one degree, requires a more complex system in order to obtain the sensitivity needed. A field of view in the range of about 2-15 degrees is most suitable for an inexpensive yet sufficiently sensitive device for general scanning applications. An exception to this field of view range is for very short range, close-up scanning, such as on humans or animals. Larger fields-of-view are then desirable for improved sensitivity while maintaining small "spot" size at close range.

An embodiment of the basic invention for limited temperature ranges, such as for medical diagnostics, does not require either a range switch 34 or a zero dial 22. An alternative and more desirable arrangement is to include a temperature compensation device such as a thermistor or solid state temperature sensor, which when included properly in the circuit, provides an absolute temperature range for the display. For example, for medical diagnostics, the range may be 80° to 104° F. All of the features of fast response and ease of use are retained.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A radiation detector for providing an indication of the radiation from a surface area, the detector comprising:
   a housing having a predetermined transverse dimension and adapted to be held in hand a predetermined distance from the user's eye between the user and said surface area;
   a radiation sensor positioned at an end of the housing for sensing radiation from said surface area and providing an electrical indicator of the sensed radiation, the sensor having a field of view such that the predetermined transverse dimension defines a field of view which approximates the field of view of the radiation sensor when the housing is positioned said predetermined distance from the user's eye; and a bar graph display on the housing responsive to the electrical indication from the radiation sensor to provide a varying indication of sensed radiation as the detector is manually scanned across the surface area.

2. A radiation detector as claimed in claim 1 wherein the bar graph display is positioned on a side of the housing opposite to the radiation sensor.

3. A radiation detector as claimed in claim 2 wherein the bar graph display indicates an absolute temperature.

4. A radiation detector as claimed in claim 1 wherein a transverse dimension of the housing across the line of sight, with the housing held a predetermined distance within arm's length from the user's eye in the line of sight, defines an approximate field of view which establishes the limits of said surface area and the radiation sensor has a field of view approximately equal to the field of view defined by said transverse dimension of the housing.

5. A radiation detector as claimed in claim 4 wherein the housing is a flat housing having a width of about $3\frac{1}{2}$ inches and the field of view of the sensor is about 12 degrees.

6. A radiation detector as claimed in claim 4 wherein the field of view of the sensor is determined by an aperture having a diameter d spaced a distance 1 from the radiation sensor and d/1 is approximately equal to w/17 where w is said transverse dimension of the housing.

7. A radiation detector as claimed in claim 1 further comprising means to adjust the indication of the bar graph display while a reference surface is viewed by the radiation sensor such that the bar graph display thereafter provides an indication of a difference in sensed radiation relative to the reference surface.

8. A radiation detector as claimed in claim 7 wherein the means for adjusting the indication automatically sets the indication at a zero level.

9. A detector for providing and indication of wave energy from a remote, limited surface area, the detector comprising:

a housing adapted to be held by hand in the line of sight between a user and said limited surface area, an outer predetermined transverse dimension of the housing across the line of sight, with the housing held a predetermined distance within arm's length from the user's eye, defining an approximate field of view which establishes the limits of said surface area; and a wave energy sensor centrally positioned relative to said transverse dimension at an end of the housing, the field of view of the wave energy sensor being approximately equal to the field of view defined by said transverse dimension of the housing.

10. A detector as claimed in claim 9 wherein the housing is a flat housing havng a width of about $3\frac{1}{2}$ inches and the field of view of the sensor is about 12 degrees.

11. A detector as claimed in claim 9 wherein the field of view of the sensor is determined by an aperture having a diameter d spaced a distance 1 from the sensor and d/1 is approximately equal to w/17 where w is said transverse dimension of the housing.

12. A method of detecting radiation from a surface area comprising:

providing a radiation detector formed with at least one predetermined transverse dimension and having a radiation sensor and a bar graph display;

setting an indication on the bar graph display at a reference level while sensing the radiation from a reference surface; and scanning the radiation sensor across an extended field of view with the radiation detector held a predetermined distance from the user's eye while observing variations in the bar graph display from the reference indication such that the predetermined transverse dimension defines a field of view which approximates the predetermined field of view of the radiation sensor.

13. A method as claimed in claim 12 wherein the bar graph display is automatically set to a zero level on the bar graph scale.

14. A method as claimed in claim 12 wherein the radiation detector is held in the line of sight between the user's eye and a surface area being scanned by the radiation sensor and a transverse dimension of the radiation detector defines a field of view which approximates the field of view of the radiation sensor.

15. A method of detecting radiation from a surface area comprising holding a radiation detector housing in the field of view between the user's eye and the surface area from which radiation is being detected, a predetermined transverse dimension of the housing across the line of sight in said field of view, with the housing held a predetermined distance within arm's length from the user's eye, defining a field of view which approximates the predetermined field of view of a radiation sensor centrally positioned relative to said transverse dimension at an end of the housing opposite to the user's eye, and detecting radiation from the surface area by display means of the radiation sensor.

16. A radiation detector for providing an indication of the radiation from a surface area, the detector comprising:

a housing adapted to be held in hand between a user and said surface area;

a radiation sensor positioned at an end of the housing for sensing radiation from said surface area and providing an electrical indication of the sensed radiation, wherein a predetermined transverse dimension of the housing across the line of sight, with the housing held a predetermined distance within arm's length from the user's eye in the line of sight defines an approximate field of view which establishes the limits of said surface area and the radiation sensor has a field of view approximately equal to the field of view defined by said transverse dimension of the housing; and a bar graph display on the housing responsive to the electrical indication from the radiation sensor to provide a varying indication of sensed radiation as the detector is manually scanned across the surface area.

17. A radiation detector as claimed in claim 16 wherein the housing is a flat housing having a width of about $3\frac{1}{2}$ inches and the field of view of the sensor is about 12 degrees.

18. A radiation detector as claimed in claim 16 wherein the field of view of the sensor is determined by an aperture having a diameter d spaced a distance 1 from the radiation sensor and d/1 is approximately equal to w/17 where w is said transverse dimension of the housing.

19. A radiation detector as claimed in claim 16 wherein the bar graph display is positioned on a side of the housing opposite to the radiation sensor.

20. A method of detecting radiation from a surface area comprising:

providing a radiation detector formed with at least a predetermined transverse dimension and having a radiation sensor and a bar graph display;

setting an indication on the bar graph display at a reference level while sensing the radiation from a reference surface;

holding the radiation detector in the line of sight between the user's eye and a surface area to be scanned by the radiation sensor such that the predetermined transverse dimension of the radiation detector defines a field of view which approximates the predetermined field of view of the radiation sensor; and scanning the radiation sensor across an extended field of view while observing variations in the bar graph display from the reference indication.

* * * * *